US009909479B2

(12) United States Patent
Shomura et al.

(10) Patent No.: US 9,909,479 B2
(45) Date of Patent: Mar. 6, 2018

(54) ENGINE FOR OUTBOARD MOTOR

(71) Applicant: SUZUKI MOTOR CORPORATION, Hamamatsu-Shi, Shizuoka (JP)

(72) Inventors: Nobuyuki Shomura, Hamamatsu (JP); Ryuji Hamada, Hamamatsu (JP); Tomohiko Miyaki, Hamamatsu (JP); Toshio Hayashi, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/228,057

(22) Filed: Aug. 4, 2016

(65) Prior Publication Data
US 2017/0058744 A1 Mar. 2, 2017

(30) Foreign Application Priority Data
Aug. 26, 2015 (JP) ................................ 2015-167076

(51) Int. Cl.
| | |
|---|---|
| *B63B 35/73* | (2006.01) |
| *F01N 3/32* | (2006.01) |
| *B63H 20/00* | (2006.01) |
| *B63H 20/24* | (2006.01) |
| *F02M 35/10* | (2006.01) |
| *F02M 35/12* | (2006.01) |
| *F01N 13/08* | (2010.01) |
| *F02B 75/20* | (2006.01) |

(Continued)

(52) U.S. Cl.
CPC .............. *F01N 3/32* (2013.01); *B63H 20/001* (2013.01); *B63H 20/24* (2013.01); *F01N 13/08* (2013.01); *F02M 35/10* (2013.01); *F02M 35/12* (2013.01); *F01N 13/004* (2013.01); *F01N 2590/021* (2013.01); *F02B 61/045* (2013.01); *F02B 75/20* (2013.01); *Y02T 10/20* (2013.01)

(58) Field of Classification Search
CPC ...... F02B 61/045; F02B 75/007; F02B 75/20; B63H 20/24; F01N 3/326; F01N 13/18; F01N 2590/021; Y02T 10/20
See application file for complete search history.

(56) References Cited

U.S. PATENT DOCUMENTS

| 5,537,321 A * | 7/1996 | Yoshizaki | ............. F01N 3/2026 123/179.21 |
| 5,730,632 A * | 3/1998 | Murata | ..................... F01N 3/28 440/88 R |

(Continued)

FOREIGN PATENT DOCUMENTS

JP  2010053771 A  3/2010

*Primary Examiner* — Anthony D Wiest
(74) *Attorney, Agent, or Firm* — Troutman Sanders LLP

(57) ABSTRACT

In an exhaust passage, an exhaust manifold connected to exhaust ports of each cylinder of an engine body and formed to extend vertically is arranged in a side portion of a cylinder head. A secondary air supply system has an intake silencer, a check valve configured to permit only a flow to the exhaust passage side, a secondary air supply control valve configured to control a flow rate of the secondary air, and a secondary air supply passage configured to connect those components to each other and the exhaust passage. The secondary air supply system is arranged in a side portion of a cylinder block placed between a crankcase of the engine body and an assembly of the exhaust manifold and the cylinder head.

4 Claims, 11 Drawing Sheets

(51) Int. Cl.
*F02B 61/04* (2006.01)
*F01N 13/00* (2010.01)

(56) References Cited

U.S. PATENT DOCUMENTS

| | | | | |
|---|---|---|---|---|
| 6,955,161 B2* | 10/2005 | Suzuki | ............... | F02B 61/02 123/478 |
| 2005/0204732 A1* | 9/2005 | Kouzu | ............... | F01N 3/22 60/307 |
| 2010/0056001 A1 | 3/2010 | Konakawa et al. | | |

* cited by examiner

F I G. 2
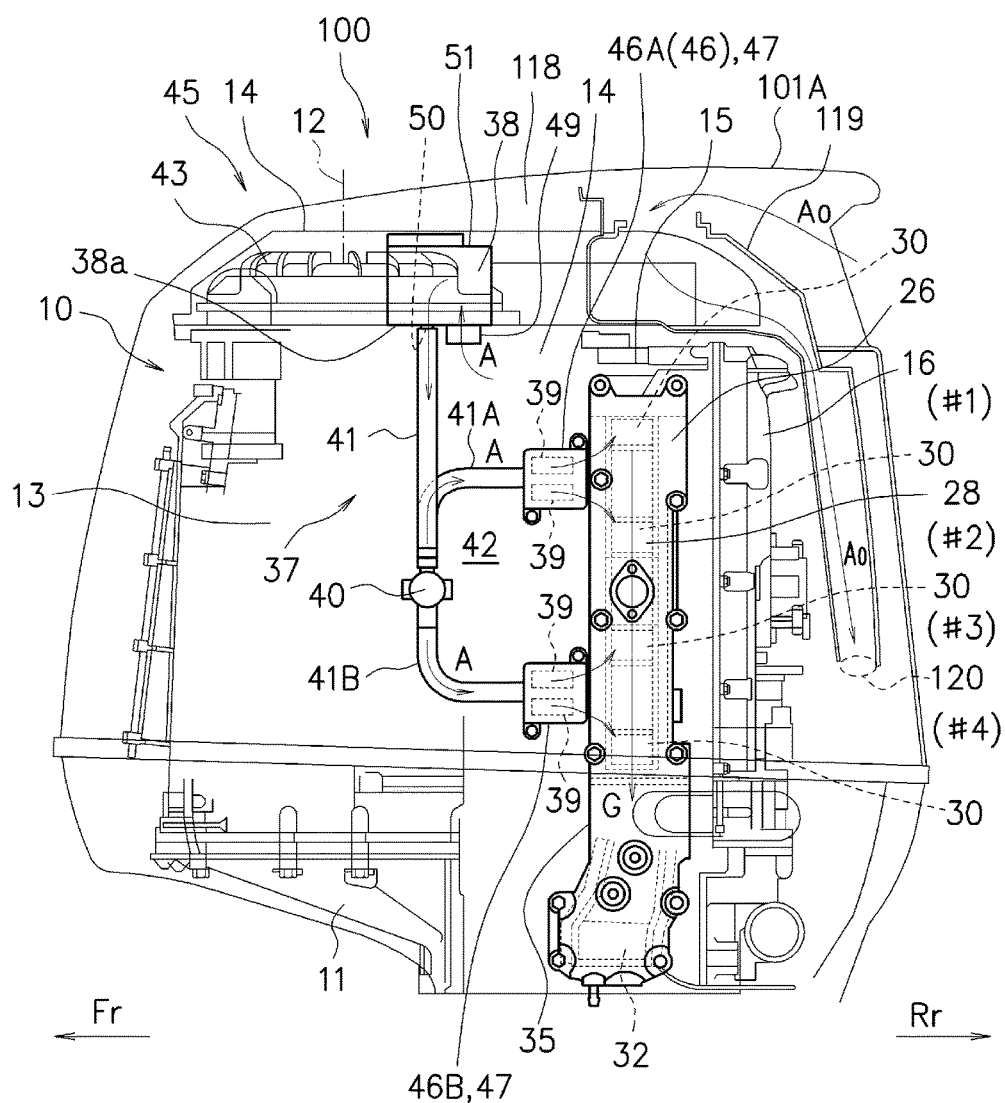

ENGINE FOR OUTBOARD MOTOR

CROSS-REFERENCE TO RELATED APPLICATION

This application is based upon and claims the benefit of priority of the prior Japanese Patent Application No. 2015-167076, filed on Aug. 26, 2015, the entire contents of which are incorporated herein by reference.

BACKGROUND OF THE INVENTION

Field of the Invention

The present invention relates to an engine for an outboard motor, and more particularly, to an engine for an outboard motor suitable for a model having a secondary air supply capability.

Description of the Related Art

An outboard motor mounted on a small boat and the like is configured such that an upper unit and a guide exhaust are connected to an upper part of a lower unit provided with a propeller, an engine is supported and fixed on the guide exhaust, the engine is covered by an engine cover, and a propeller is rotated and driven by the engine. An exhaust gas output from the engine is discharged to the seawater through an exhaust passage vertically provided on the side face of the engine across upper and lower units.

In such an engine for an outboard motor, a catalytic converter may be provided in the exhaust passage in order to purify the exhaust gas and comply with an exhaust gas control requirement in some cases. Furthermore, an air pump configured to supply the secondary air to the exhaust passage is provided in order to supply oxygen necessary to oxidize and detoxify hydrocarbons and carbon monoxides contained in the exhaust gas in the exhaust system.

For example, Japanese Laid-open Patent Publication No. 2010-53771 discusses an outboard motor provided with an air pump supported by an engine to supply secondary air to the upstream side of the catalytic converter in the middle of the exhaust passage. An air inlet port (air inlet hole) of the air pump is opened in a position higher than the engine inside a cowling in order to prevent water from mixing to the secondary air supplied by the air pump to the exhaust passage.

Patent Document 1: Japanese Laid-open Patent Publication No. 2010-53771

In general, an engine, an intake system, and an exhaust system of an outboard motor are housed in an engine housing covered by a cowling which is an engine cover. It is not easy to arrange accessories such as a catalytic converter or an air pump in addition to the intake and exhaust systems within a limited space of the engine housing. That is, a limitation inevitably exists in arrangement due to a relationship with neighboring components. It is difficult to compactly arrange a plurality of functional devices or components while the exhaust gas purification functionality is reliably obtained. In practice, this results in a size increase of the outboard motor.

SUMMARY OF THE INVENTION

In view of the aforementioned problems, it is therefore an object of the present invention to provide an engine for an outboard motor capable of effectively and suitably achieving compactification.

According to an aspect of the present invention, there is provided an engine for an outboard motor including: an in-line multiple-cylinder engine body provided with a crankshaft having an axial line directed to a vertical direction and a plurality of vertically overlapping cylinders, the cylinders having axial lines directed backward in a horizontal direction; an intake system configured to supply combustion air to the engine body; an exhaust passage formed to connect the engine body and middle and lower units thereunder; and an air pump of a secondary air supply system configured to supply secondary air to the exhaust passage, wherein a vertically extending exhaust manifold formed by connecting the exhaust passage to exhaust ports provided in each cylinder of the engine body is arranged in a side portion of the cylinder head, the secondary air supply system has an intake silencer, a check valve configured to permit only a flow of the secondary air to the exhaust passage side, a secondary air supply control valve configured to control a flow rate of the secondary air, and a secondary air supply passage configured to connect the intake silencer, the check valve, and the secondary air supply control valve to each other and the exhaust passage, and the secondary air supply system is arranged in a side portion of a cylinder block placed between a crankcase of the engine body and an assembly of the exhaust manifold and the cylinder head.

In the engine for the outboard motor described above, the intake silencer may be fixedly supported by an upper part of the engine body over the check valve corresponding to the cylinder placed thereunder.

In the engine for the outboard motor described above, the intake silencer may be fixedly supported by a flywheel cover fixed to an upper part of the engine body to cover a flywheel magneto installed to rotate in synchronization with an upper end of the crank shaft.

In the engine for the outboard motor described above, the secondary air supply control valve may be provided in an outlet port of the intake silencer, may be connected to the secondary air supply passage, and may be fixedly supported by an upper part of the engine body by interposing the intake silencer and the flywheel cover.

BRIEF DESCRIPTION OF THE DRAWINGS

FIG. 2 is a left side view illustrating an engine of the outboard motor according to the first embodiment of the invention;

DETAILED DESCRIPTION OF THE PREFERRED EMBODIMENTS

An engine for an outboard motor according to preferred embodiments of the present invention will now be described with reference to the accompanying drawings.

Figure 1:
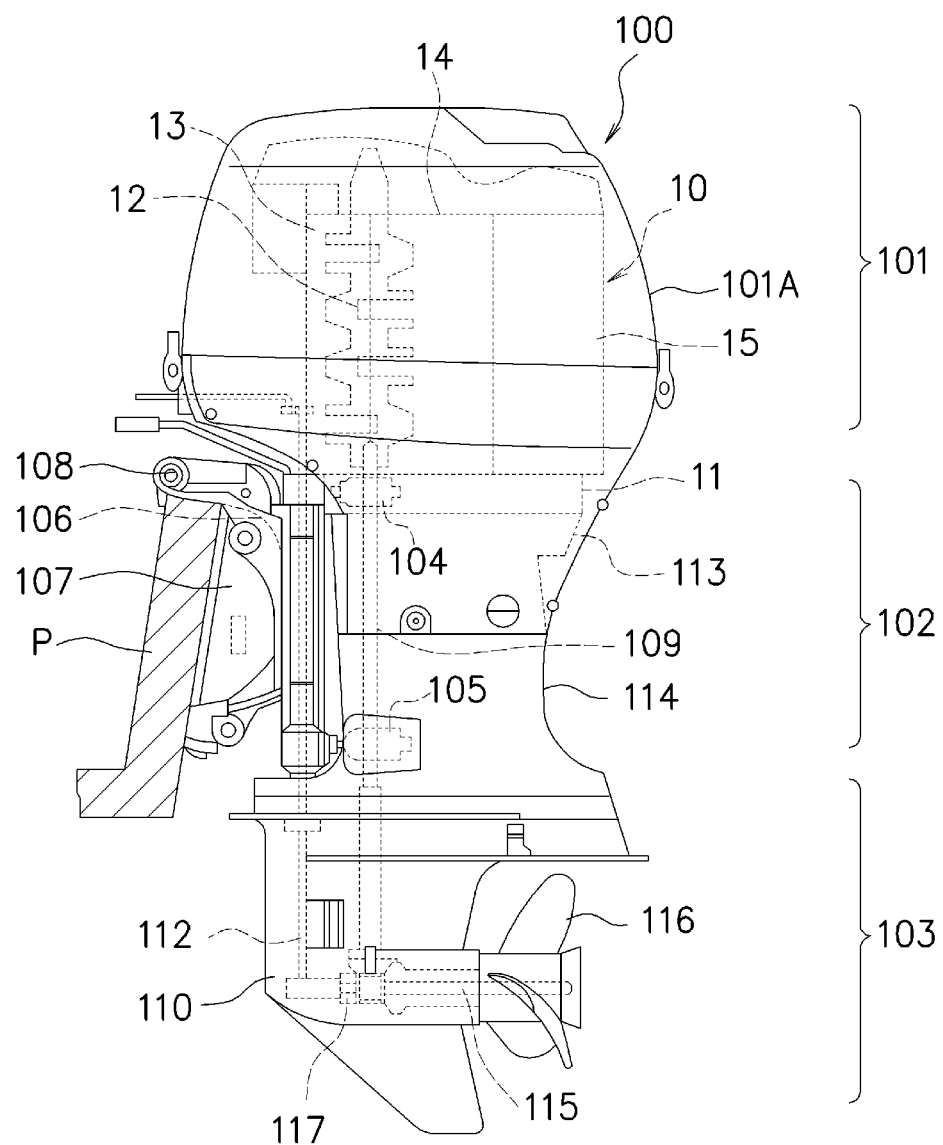
FIG. 1 is a left side view schematically illustrating an exemplary whole configuration of an outboard motor according to a first embodiment of the invention.

FIG. 1 is a left side view schematically illustrating an exemplary configuration of an outboard motor 100 according to the present invention. In this case, a front side of the outboard motor 100 is fixed to a transom P of a ship hull as illustrated in FIG. 1. It is noted that, in the following description for each drawing, the arrow Fr denotes a front side of the outboard motor 100, the arrow Rr denotes a rear side of the outboard motor 100, the arrow R denotes a right side of the outboard motor 100, and the arrow L denotes a left side of the outboard motor 100 as necessary.

First Embodiment

In the entire configuration of the outboard motor 100, an upper unit 101, a middle unit 102, and a lower unit 103 are sequentially arranged from the upside to the downside. In the upper unit 101, the engine 10 is vertically installed in and supported by an engine holder 11 such that a crankshaft 12 is directed to a vertical direction. As the engine 10, various engine types such as an in-line multi-cylinder engine may be employed. A cylinder block 14, a cylinder head 15, and a cylinder head cover 16 are sequentially assembled to a crankcase 13 that supports the crankshaft 12. In the engine 10, a plurality of cylinders having cylinder axes directed backward in a horizontal direction are arranged in a vertically overlapping manner. Further, the engine 10 is covered by the engine cover 101A.

The middle unit 102 is supported by upper and lower mounts 104 and 105 horizontally pivotably around a support shaft set in a swivel bracket 106. A clamp bracket 107 is provided in both sides of the swivel bracket 106, so that the middle unit 102 is fixed to the transom P of the ship hull using the clamp bracket 107. The swivel bracket 106 is supported vertically pivotably around a tilt shaft 108 set in the left-right direction.

In the middle unit 102, a drive shaft 109 connected to a lower end portion of the crankshaft 12 of the engine 10 is arranged to vertically penetrate, so that a drive force of the drive shaft 109 is transmitted to a propeller shaft 115 arranged in a gear casing 110 of the lower unit 103. A shift rod 112 for shifting a gear position forward or backward is arranged in front of the drive shaft 109 in parallel with the vertical direction. In addition, the middle unit 102 is also provided with an oil pan 113 for storing oil for lubricating the engine 10. Further, the middle unit 102 has a drive shaft housing 114 for housing the drive shaft 109.

In the lower unit 103, the gear casing 110 internally has a plurality of gear groups 117 and the like to rotatably drive the propeller 116 using the propeller shaft 115 by virtue of the drive force of the drive shaft 109. In the gear group 117, a gear provided in the drive shaft 109 extending downward from the middle unit 102 meshes with the gear of the gear casing 110 so as to finally rotate the propeller 116. However, a power transmission path of the gear group 117 in the gear casing 110 is switched, that is, shifted by performing a shift operation using the shift rod 112.

Figure 3:
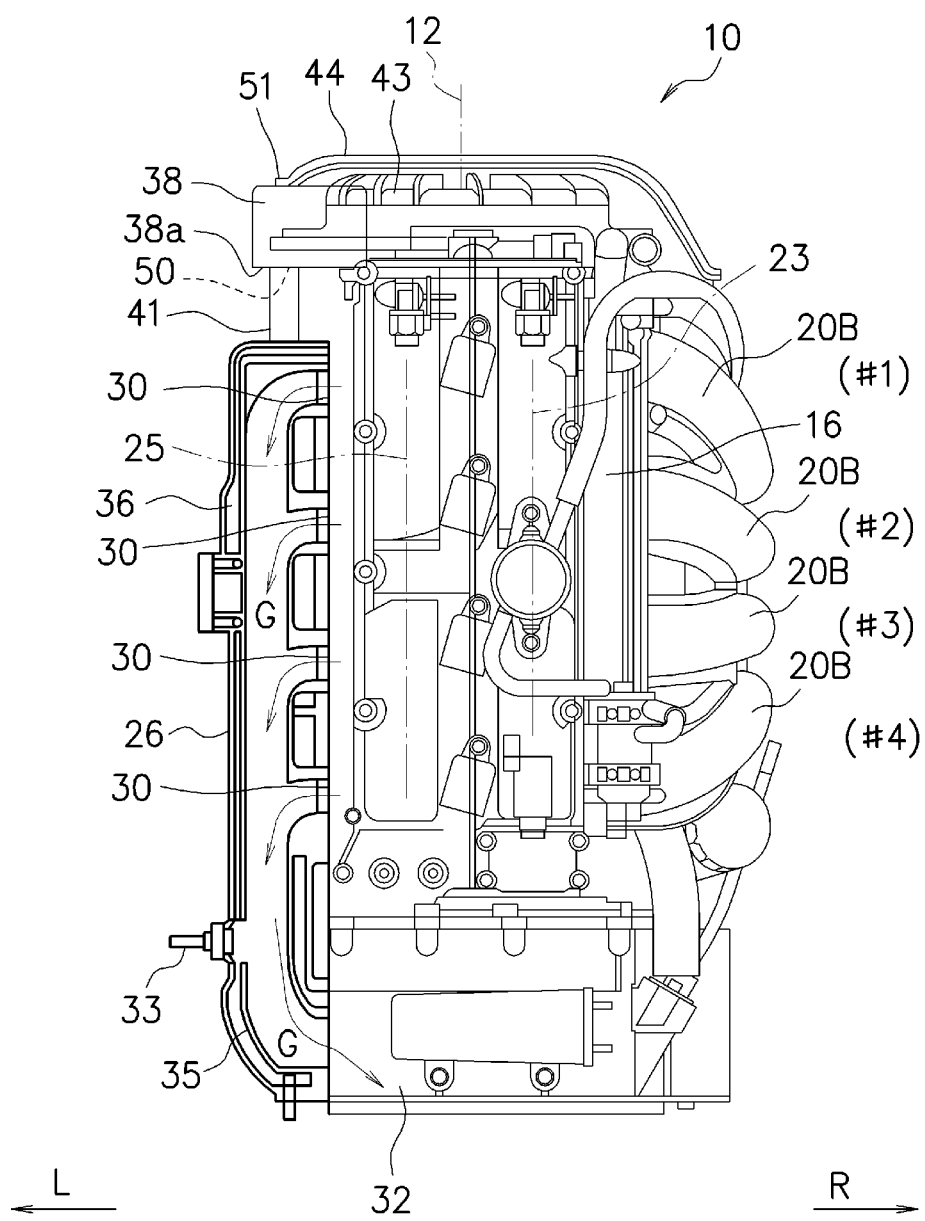
FIG. 3 is a rear front view illustrating the engine of the outboard motor according to the first embodiment of the invention.
Figure 4:
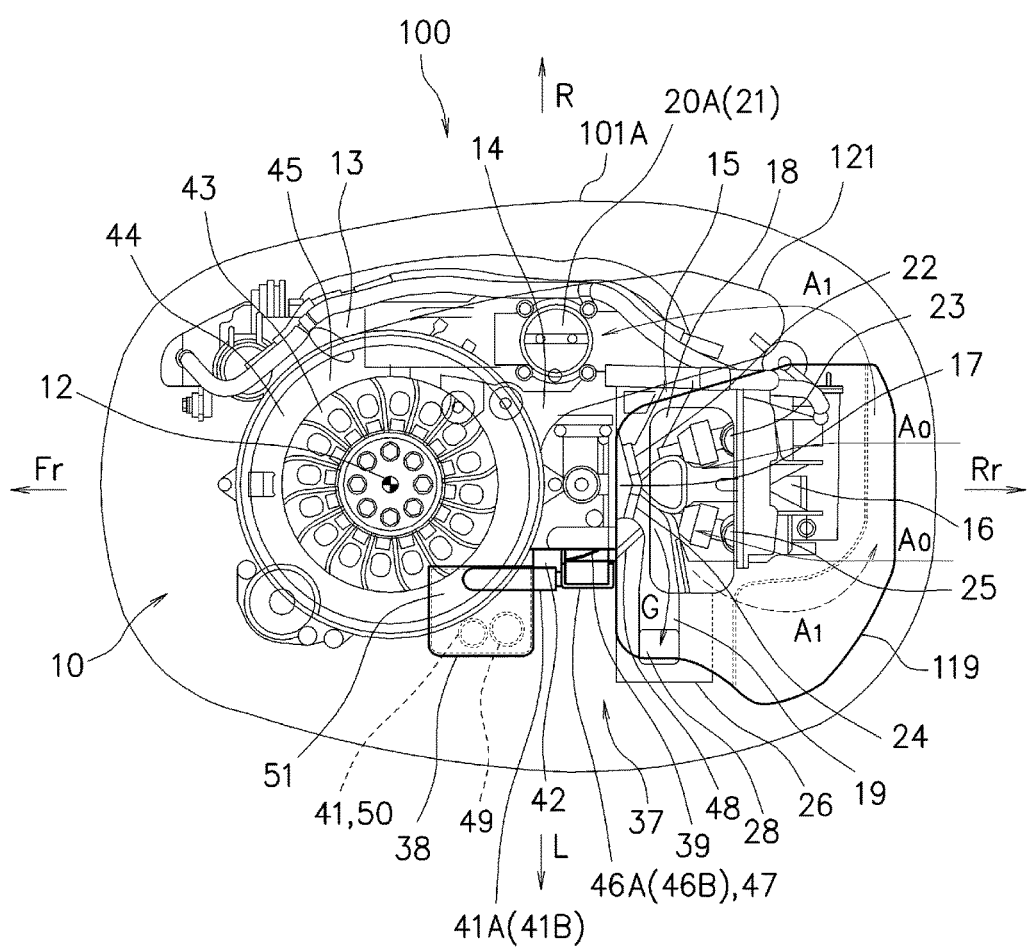
FIG. 4 is a top view illustrating the engine of the outboard motor according to the first embodiment of the invention.

FIGS. 2 to 4 illustrate an exemplary engine 10 according to this embodiment. FIG. 2 is a left side view illustrating the engine 10. FIG. 3 is a rear front view illustrating the engine 10. FIG. 4 is a top view illustrating the engine 10. It is assumed that the engine 10 of this example is an in-line four-cylinder engine, in which four cylinders including the first cylinder #1, the second cylinder #2, the third cylinder #3, and the fourth cylinder #4 are sequentially arranged from the upside as illustrated in FIG. 3. The engine 10 is mounted onto the engine holder 11 in the fourth cylinder (#4) side such that the crankcase 13 is arranged in the front side, and the cylinder head 15 is arranged in the rear side. While the engine 10 will be described in brief with reference to FIGS. 2 to 4, some of components thereof may be appropriately omitted or not as necessary for simplicity purposes.

In the crankcase 13, the crankshaft 12 (crankshaft) is supported by a plurality of journal bearings in its upper and lower end portions and the middle portion therebetween rotatably inside the crankcase 13. The lower end of the crankshaft 12 may also be coupled to the upper end of the drive shaft 109, for example, by interposing a pair of coupling gears (reduction gears). As a result, the rotational force of the crankshaft 12 is transmitted to the drive shaft 109.

The cylinder block 14 is internally provided with cylinder bores for each cylinder, so that pistons are inwardly fitted to the cylinder bores in a reciprocatable manner (in this example, in a front-rear direction). The piston is connected to a crank pin of the crankshaft 12 by interposing a connecting rod. As a result, a reciprocating motion of the piston inside the cylinder bore is converted into a rotational motion of the crankshaft 12 and is transmitted to the drive shaft 109 as the output power of the engine 10.

Referring to FIG. 4, the cylinder head 15 is provided with combustion chambers 17 matching cylinder bores of each cylinder and intake and exhaust ports 18 and 19 communicating with respective combustion chambers 17. In this example, an intake system is arranged in the right side of the engine 10, and an exhaust system is arranged in the left side of the engine 10. First, in the intake system, the intake air flows into an intake manifold with a flow rate controlled by a throttle body 20A arranged in the right side of the cylinder block 14. This intake air is supplied to an intake port 18 via an intake branch 20B configured to branch the intake air to each cylinder from the intake manifold (refer to FIG. 3). The throttle body 20A, the intake branch 20B, the intake manifold, and the like constitute an intake system 21 for supplying combustion air to the engine 10. For the open/close operation of the intake port 18, a communicating portion to the combustion chamber 17 is controlled by an intake valve 22. In this case, the intake valve 22 is driven by a cam provided in an intake cam shaft 23 provided to vertically extend. In addition, for the open/close operation of the exhaust port 19 in the exhaust system, a communicating portion to the combustion chamber 17 is controlled by an exhaust valve 24. In this case, the exhaust valve 24 is driven by a cam provided in an exhaust cam shaft 25 provided to vertically extend. It is noted that, in this embodiment, each cylinder may have a so-called four-valve structure having a pair of valves (intake valves 22 and exhaust valves 24) for the intake and exhaust sides, respectively.

On top of the combustion chamber 17 of each cylinder, an ignition plug is installed, so that a mixed gas supplied to the inside of the combustion chamber 17 is ignited by the ignition plug. Furthermore, the combustion gas exploded and combusted inside each cylinder bore of each cylinder is discharged from the exhaust port 19 to the exhaust manifold 26. In each cylinder, the exhaust manifold 26 provided in the outer side portion of the cylinder bore of the cylinder block 14 is connected to the exhaust port 19 to communicate with each other. As illustrated in FIGS. 2 and 3, the exhaust manifold 26 is provided to vertically extend on the left side face of the cylinder head 15 so that the exhaust gases from each exhaust port 19 are joined. The confluent exhaust gas passes through the exhaust manifold 26 and is finally guided to the lower side of the engine 10 as described below. Then, the exhaust gas passes through an exhaust passage formed inside the engine holder 11 and is finally discharged to the water.

As an exemplary configuration of the engine 10 according to this embodiment, an exhaust passage 28 is formed to extend from the exhaust manifold 26 of the exhaust system to the middle and lower units 102 and 103 provided in the lower part of the engine 10. The exhaust manifold 26 included in a part of the exhaust passage 28 is provided with a plurality of openings 30 (in this example, four openings) connected to the exhaust ports 19 of each cylinder. Furthermore, the exhaust passage 28 extends downward (to form an extension 35) while it is curved under the exhaust manifold 26 and is connected to an exhaust communicating passage 32 formed inside the engine holder 11, so that the exhaust passage 28 communicates with the middle unit 102 through the exhaust communicating passage 32. Moreover, a water jacket 36 is provided in the outer circumferential portion of the passage generally along the entire length of the exhaust passage 28. As a result, a coolant sent from a water pump of a cooling system is circulated through the inside of the water jacket 36 to cool the exhaust passage 28.

Here, in the engine 10, the crankcase 13, the cylinder block 14, the cylinder head 15, and the cylinder head cover 16 generally constitute an engine body. An intake system 21 for supplying combustion air to the engine body is arranged in one side of the engine body in the left-right direction, that is, in the right side in this example. In addition, an exhaust passage 28 for discharging the combustion gas from the engine body is arranged in the other side of the engine body in the left-right direction, that is, in the left side in this example.

In the exhaust system, the exhaust gases discharged from the exhaust ports 19 of each cylinder flow into the opening 30 of the exhaust manifold 26 and are joined inside the exhaust manifold 26 (in FIGS. 2 to 4, the arrow G denotes the flow of the exhaust gas as necessary). The confluent exhaust gas flows downward inside the exhaust manifold 26, further passes through the exhaust communicating passage 32 inside the engine holder 11 and is then discharged to the water via the middle and lower units 102 and 103.

According to the present invention, a secondary air supply system 37 configured to supply secondary air to the exhaust passage 28 is further provided. This secondary air supply system 37 supplies the secondary air to the exhaust gas flowing through the exhaust passage 28 in order to purify the exhaust gas, that is, supplies oxygen necessary to oxidize and detoxify hydrocarbons and carbon monoxides contained in the exhaust gas in the exhaust system. That is, oxidization of the exhaust gas is promoted by reacting oxygen with the exhaust gas, and a discharge amount of hydrocarbons and carbon monoxides is reduced.

Figure 5:
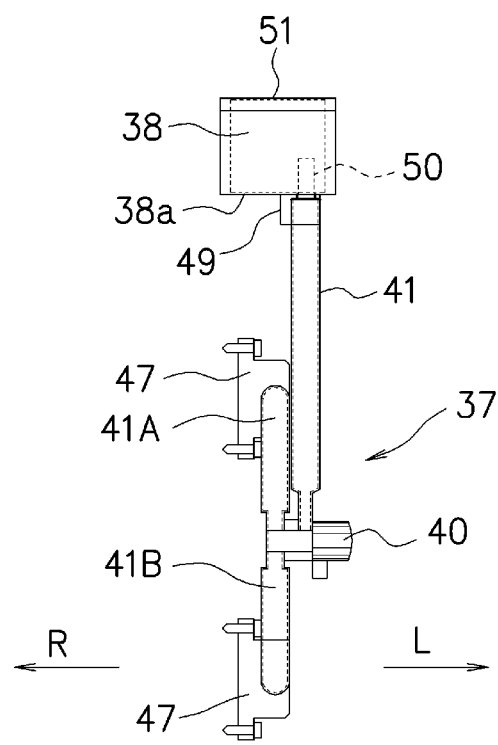
FIG. 5 is a diagram illustrating a specific configuration example of a secondary air supply system according to the first embodiment of the invention.

Specifically, as illustrated in FIG. 5, the secondary air supply system 37 includes an intake silencer 38, a check valve 39 (reed valve) configured to permit only a flow of the secondary air to the exhaust passage side, a secondary air supply control valve 40 configured to control a flow rate of the secondary air, and a secondary air supply passage 41 configured to connect those components to each other and the exhaust passage 28.

In this case, the secondary air supply system 37 is arranged in the other side (in this example, the left side) of the engine body in the left-right direction, that is, in the same side as that of the exhaust passage 28. More specifically, the secondary air supply system 37 is arranged in a concave portion 42 placed in a side portion of the cylinder block 14 between the crankcase 13 of the engine body and the assembly of the exhaust manifold 26 and the cylinder head 15.

The intake silencer 38 is fixedly supported by an upper part of the engine body over the check valve 39 corresponding to the cylinder disposed thereunder.

Since the fuel supplied to the engine 10 becomes rich in the event of acceleration of the outboard motor 100 and the like, an oxygen concentration in the exhaust gas becomes thin. For this reason, the secondary air supply system 37 is driven and controlled to supply the secondary air to the exhaust gas. In this case, the oxygen concentration in the exhaust gas may be detected using an oxygen concentration sensor 33 (in FIG. 3), so that the oxygen concentration detection value is transmitted to an electronic control unit (ECU) mounted to the outboard motor 100. The secondary air supply control valve 40 of the secondary air supply system 37 includes, for example, an electromagnetic valve such as a solenoid valve. The ECU operates the secondary air supply control valve 40, that is, controls an open/close state of the secondary air supply passage 41 depending on whether or not the oxygen concentration in the exhaust gas is equal to or higher than a predetermined threshold value on the basis of the oxygen concentration information of the oxygen concentration sensor 33.

Here, the engine 10, the intake system, and the exhaust system are housed in the engine housing 118 covered by the engine cover 101A (cowling). An external air guide unit for guiding the external air from the upper part of the engine housing 118 to the inside of the engine housing 118, specifically, an external air intake duct 119 is provided as illustrated in FIG. 2. In the vicinity of the bottom of the external air intake duct 119, an inflow port 120 for receiving the air guided from the external air intake duct 119 is opened in a rear part of the engine housing 118 behind the engine body (in FIG. 2, the arrow $A_o$ denotes a flow of the air guided to the inside of the engine housing 118).

The air input to the inside of the engine housing 118 from the inflow port 120 flows to the throttle body 20A through an intake duct 121 for use as the intake air of the engine 10. As illustrated in FIG. 4, the intake duct 121 covers an upper part of the throttle body 20A so that the air inside the engine housing 118 is directed to the throttle body 20A as indicated by the arrow $A_1$ and flows along the intake duct 121.

The engine 10 has a ventilation unit 45 provided with a flywheel magneto 43 installed to an axial end of the crankshaft 12 to rotate in synchronization with each other in the upper part of the engine body and included in a ventilation fan, and a flywheel cover 44 that covers the flywheel magneto 43 and is connected to a ventilation outlet port (not shown) of the engine cover 101A. The ventilation unit 45 discharges the air received by the engine housing 118 through the external air intake duct 119 and circulated inside the engine housing 118 into the outside of the engine cover 101A to ventilate the engine housing 118.

As described above, the secondary air supply system 37 and the exhaust system are connected to each other through the secondary air supply passage 41. According to this embodiment, the connecting portion 46 (46A and 46B) of the secondary air supply passage 41 (41A and 41B) is formed integrally with the cylinder block 14 included in the engine body, and the secondary air supply passage 41 extending downward from the intake silencer 38 is connected to the secondary air supply control valve 40 and branches into two separate ways in the downstream side. In addition, the branching secondary air supply passages 41A and 41B are connected to the corresponding connecting portions 46A (#1 and #2 cylinders) and 46B (#3 and #4 cylinders), respectively. Each connecting portion 46A and 46B is installed with a check valve 39 for each cylinder, and a cover 47 is installed to cover the check valve 39. A communicating passage 48 that causes the connecting portions 46A and 46B and the exhaust ports 19 of each cylinder to communicate with each other is provided, so that the secondary air discharge side of each check valve 39 and the exhaust port 19 are connected to each other through the communicating passage 48.

The intake silencer 38 of the secondary air supply system 37 has a gas-liquid separation capability and a sound muffling capability for the received air. Specifically, the intake silencer 38 has a bottom surface 38a formed integrally with a part of the flywheel cover 44 and provided with an inlet port 49 and an outlet port 50 for the secondary air. The inlet port 49 is opened downward, and the outlet port 50 is formed of a pipe-like member provided to extend upward appropriately from the bottom surface 38a inside the intake silencer 38. In addition, the outlet port 50 is connected to the secondary air supply passage 41 outside the intake silencer 38. Furthermore, the intake silencer 38 has an upper part capped by a lid member 51 and integrated with the flywheel cover 44 to provide a compact configuration in addition to the gas-liquid separation capability and the sound muffling capability.

As a basic operation of the exhaust system of the engine 10 according to the present invention, the exhaust erases discharged from the exhaust ports 19 of each cylinder flow to the opening 30 of the exhaust manifold 26 and are joined in the exhaust manifold 26, so that the confluent gas is discharged to the water through the exhaust passage 28. In this case, the ECU operates to open the secondary air supply control valve 40 so that the intake silencer 38 and the connecting portion 46 communicate with each other through the secondary air supply passage 41. During the operation of the engine 10, a negative pressure generated by surging of the exhaust gas inside the exhaust manifold 26 makes the check valve 39 open, so that the secondary air flows from the connecting portion 46 to the exhaust port 19 through the communicating passage 48. In this manner, the secondary air is supplied to the exhaust gas by operating the secondary air supply system 37. Therefore, hydrocarbons, carbon monoxides, nitrogen oxides, and the like contained in the exhaust gas are oxidized or reduced. As a result, hazardous substances in the exhaust gas are removed, that is, the exhaust gas can be purified.

According to the present invention, in particular, the secondary air supply system 37 is arranged in a concave portion 42 placed in a side portion of the cylinder block 14 between the crankcase 13 of the engine body and the assembly of the exhaust manifold 26 and the cylinder head 15. In this manner, since the secondary air supply system 37 is arranged in the side portion of the cylinder block 14, which is narrow in the left-right direction, it is possible to compactly configure the outboard motor 100, particularly, in terms of the width of the left-right direction.

In addition, the intake silencer 38 is fixedly supported by an upper part of the engine body over the check valve 39 corresponding to the cylinder disposed thereunder.

In this manner, the intake silencer 38 is arranged over the check valve 39. Therefore, even when water intrudes into the secondary air supply passages 41A and 41B, the water is discharged to the exhaust passage 28 from the check valve 39. As a result, it is possible to prevent a problem in supply of the secondary air that may be generated when the secondary air supply passages 41A and 41B are blocked with the water.

The intake silencer 38 is fixed to an upper part of the engine body and is fixedly supported by the flywheel cover 44 that covers the flywheel magneto 43.

In this manner, a part of the flywheel cover 44 is used as a support member. Therefore, a stay or the like dedicated to the intake silencer 38 is not necessary, and the configuration can be simplified. As a result, it is possible to effectively utilize a narrow space of the engine housing 118.

Second Embodiment

Figure 6:
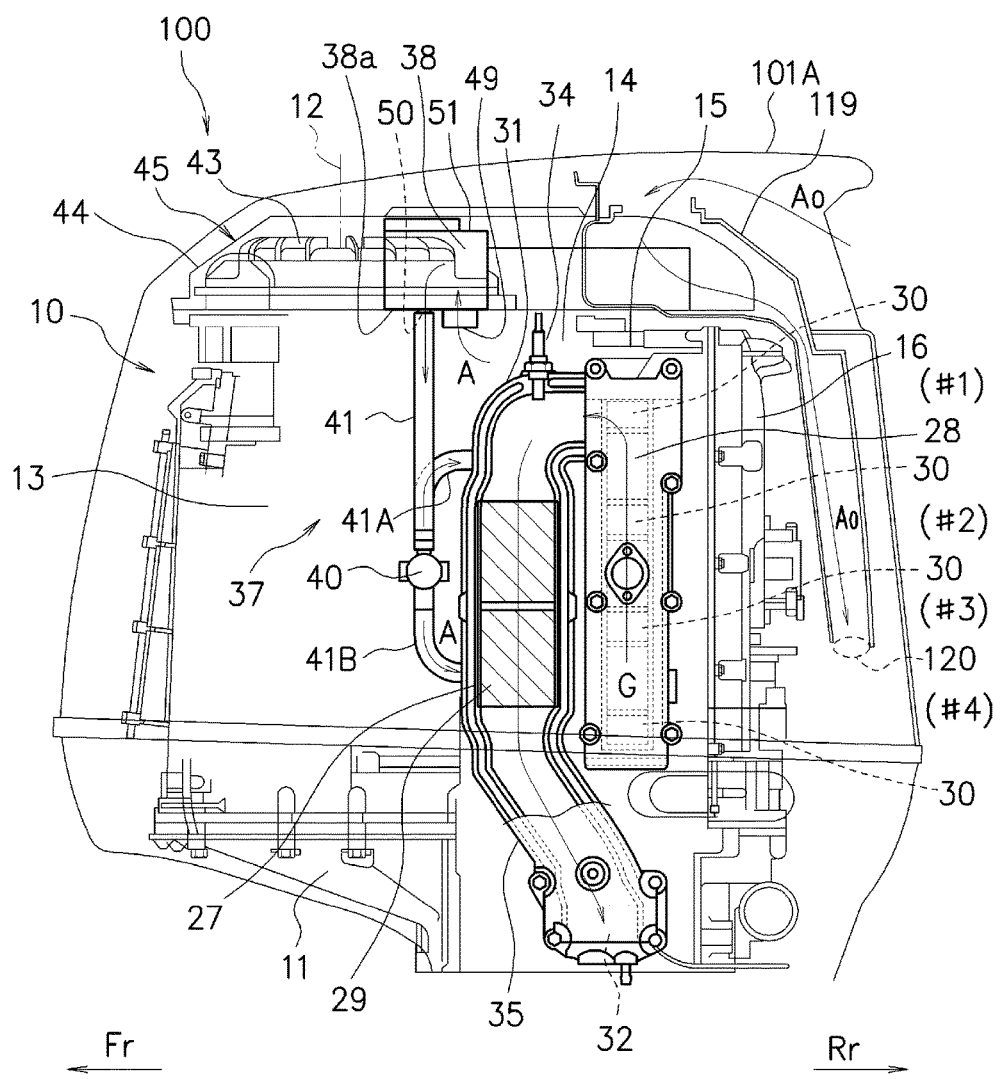
FIG. 6 is a left side view illustrating an engine of an outboard motor according to a second embodiment of the invention.
Figure 7:
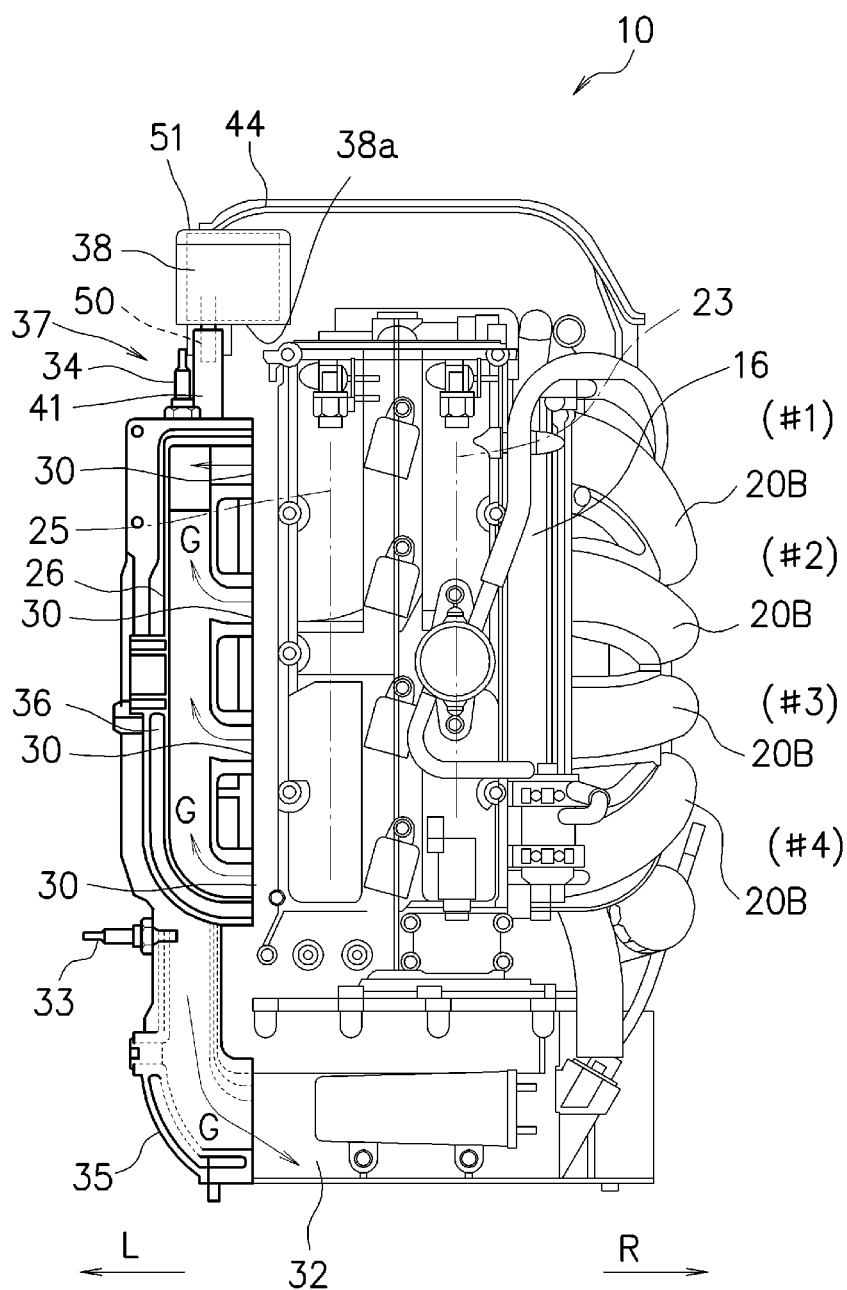
FIG. 7 is a rear front view illustrating the engine of the outboard motor according to the second embodiment of the invention.
Figure 8:
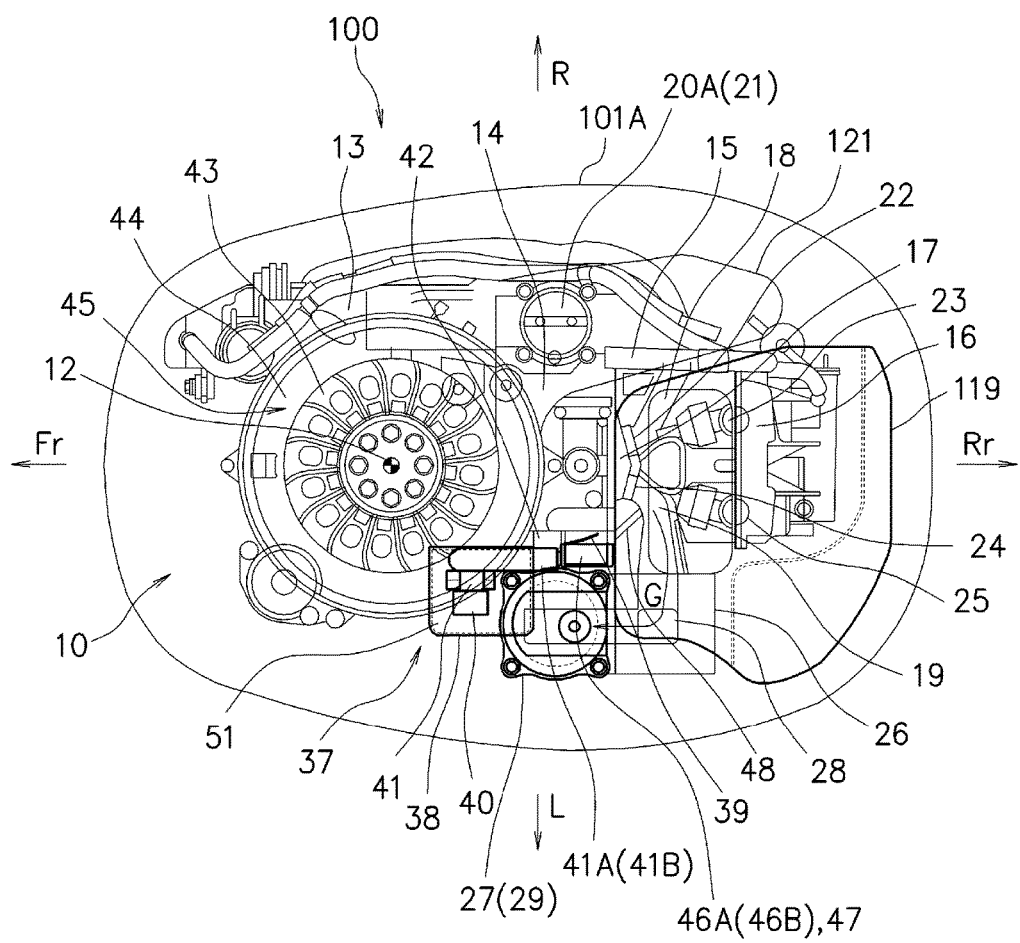
FIG. 8 is a top view illustrating the engine of the outboard motor according to the second embodiment of the invention.
Figure 9A:
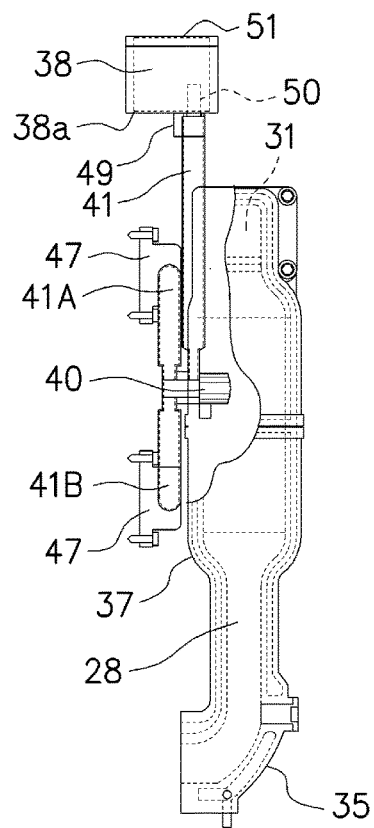
FIG. 9A is a diagram illustrating surroundings of a catalyst housing portion of an exhaust passage according to the second embodiment of the invention.
Figure 9B:
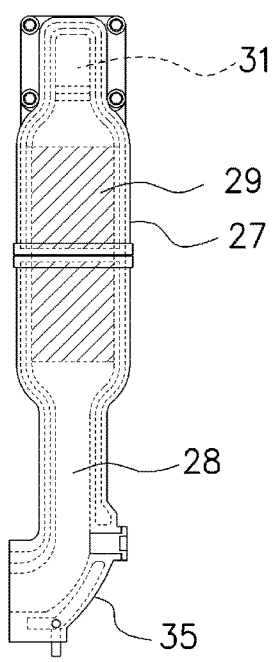
FIG. 9B is a diagram illustrating surroundings of the catalyst housing portion of the exhaust passage according to the second embodiment of the invention.

Next, an engine for an outboard motor according to a second embodiment of the invention will be described. FIGS. 6 to 9B illustrate a second embodiment of the present invention. Specifically, FIG. 6 is a left side view illustrating an engine 10 according to the second embodiment, and FIG. 7 is a rear front view illustrating the engine 10, and FIG. 8 is a top view illustrating the engine 10. In addition, FIGS. 9A and 9B are diagrams illustrating surroundings of the exhaust passage in which a catalyst can be installed. In FIGS. 6 to 9B, like reference numerals denote like elements as in the first embodiment.

Referring to FIG. 6, as an exemplary configuration of the engine 10 according to the second embodiment, a catalyst 29 is installed in the middle of the exhaust passage 28 of the exhaust system, and the exhaust passage 28 is formed to extend from the exhaust manifold 26 to the middle and lower units 102 and 103 of the lower part of the engine 10 through the catalyst housing portion 27. The catalyst housing portion 27 is provided to extend vertically in parallel with the exhaust manifold 26 in front of the exhaust manifold 26 and internally houses the catalyst 29. The exhaust manifold 26 included in a part of the exhaust passage 28 is provided with a plurality of openings 30 (in this example, four openings) connected to the exhaust ports 19 of each cylinder. In addition, the upper parts of the exhaust manifold 26 and the catalyst housing portion 27 are connected to each other through the connecting passage 31. Furthermore, the exhaust passage 28 extends downward while it is curved under the catalyst housing portion 27 and is connected to an exhaust communicating passage 32 formed inside the engine holder 11, so that the exhaust passage 28 communicates with the middle unit 102 through the exhaust communicating passage 32.

In this manner, the exhaust passage 28 includes the exhaust manifold 26, the connecting passage 31, the catalyst housing portion 27, and the exhaust communicating passage 32. In the middle of the exhaust passage 28, an oxygen concentration sensor 33 for detecting an oxygen concentration in the exhaust gas is installed in an exhaust downstream side of the catalyst housing portion 27 that houses the catalyst 29, specifically, in a suitable region of the extension 35 from the lower part of the catalyst housing portion 27 (refer to FIGS. 6 and 7). Alternatively, an oxygen concentration sensor 34 may be installed in an exhaust upstream side of the catalyst housing portion 27, for example, in a suitable region of the exhaust manifold 26 or the connecting passage 31 (refer to FIG. 6). Using such an oxygen concentration sensor 34, it is possible to detect an oxygen concentration in the exhaust gas in such an installation region.

In the exhaust system, the exhaust gases discharged from the exhaust ports 19 of each cylinder flow into the opening 30 of the exhaust manifold 26 and are joined inside the exhaust manifold 26 (in FIGS. 6 and 7, the arrow G denotes a flow of the exhaust gas as necessary). The confluent exhaust gas flows upward inside the exhaust manifold 26 and flows to the catalyst housing portion 27 through the connecting passage 31 in the upper part thereof. Furthermore, the exhaust gas passes through the catalyst 29 inside the catalyst housing portion 27 and flows into the extension 35 from the lower part of the catalyst housing portion 27. Then, the exhaust gas passes through the exhaust communicating passage 32 inside the engine holder 11 and flows to the middle unit 102 and further to the lower unit 103. Then, the exhaust gas is discharged to the water.

Similarly, according to the second embodiment of the invention, the exhaust passage 28 is provided with the secondary air supply system 37 for supplying the secondary air. The configuration of the secondary air supply system 37 is substantially similar to that of the first embodiment. The secondary air supply system 37 includes the intake silencer 38, the check valve 39 configured to permit only a flow of the secondary air to the exhaust passage side, the secondary air supply control valve 40 configured to control a flow rate of the secondary air, and the secondary air supply passage 41 used to connect those components to each other and the exhaust passage 28.

In this case, the secondary air supply system 37 is arranged in the other side (in this example, the left side) of the engine body in the left-right direction, that is, in the same side as that of the exhaust passage 28. More specifically, the secondary air supply system 37 is arranged in a concave portion 42 placed in a side portion of the cylinder block 14 between the crankcase 13 of the engine body and the assembly of the exhaust manifold 26 and the cylinder head 15.

According to the second embodiment of the invention, the catalyst 29 may be installed in the catalyst housing portion 27 (as illustrated in FIG. 9A), or the catalyst 29 may be omitted (as illustrated in FIG. 9B). In this case, as illustrated in FIG. 9A and the like, the secondary air supply passages 41A and 41B are routed to pass through the vicinity of the catalyst housing portion 27.

As a basic operation of the exhaust system of the engine 10 according to the second embodiment of the invention, the exhaust gases discharged from the exhaust ports 19 of each cylinder flow to the opening 30 of the exhaust manifold 26 and are joined in the exhaust manifold 26, so that the confluent gas is discharged to the water through the exhaust passage 28. In this case, the ECU operates to open the secondary air supply control valve 40 so that the intake silencer 38 and the connecting portion communicate with each other through the secondary air supply passage 41. During the operation of the engine 10, a negative pressure generated by surging of the exhaust gas inside the exhaust manifold 26 makes the check valve 39 open, so that the secondary air flows from the connecting portion 46 to the exhaust port 19 through the communicating passage 48. In this manner, the secondary air is supplied to the exhaust gas by operating the secondary air supply system 37. Therefore, hydrocarbons, carbon monoxides, nitrogen oxides, and the like contained in the exhaust gas are oxidized or reduced. As a result, hazardous substances in the exhaust gas are removed, that is, the exhaust gas can be purified.

According to the second embodiment, the catalyst 29 can be installed. In this case, the exhaust gas passes through the catalyst 29 inside the catalyst housing portion 27, so that the hydrocarbons, carbon monoxides, nitrogen oxides, and the like predominantly contained in the exhaust gas are oxidized or reduced. As a result, it is possible to remove hazardous substances in the exhaust gas and more effectively purify the exhaust gas.

Third Embodiment

Next, an engine for an outboard motor according to a third embodiment of the invention will be described. According to the third embodiment, the engine 10 and the exhaust system have similar configurations to those of the first embodiment. That is, the secondary air supply system 37 includes the intake silencer 38, the check valve 39 configured to permit only a flow of the secondary air to the exhaust passage side, the secondary air supply control valve 40 configured to control a flow rate of the secondary air, and the secondary air supply passage 41 configured to connect those components to each other and the exhaust passage 28.

Figure 10:
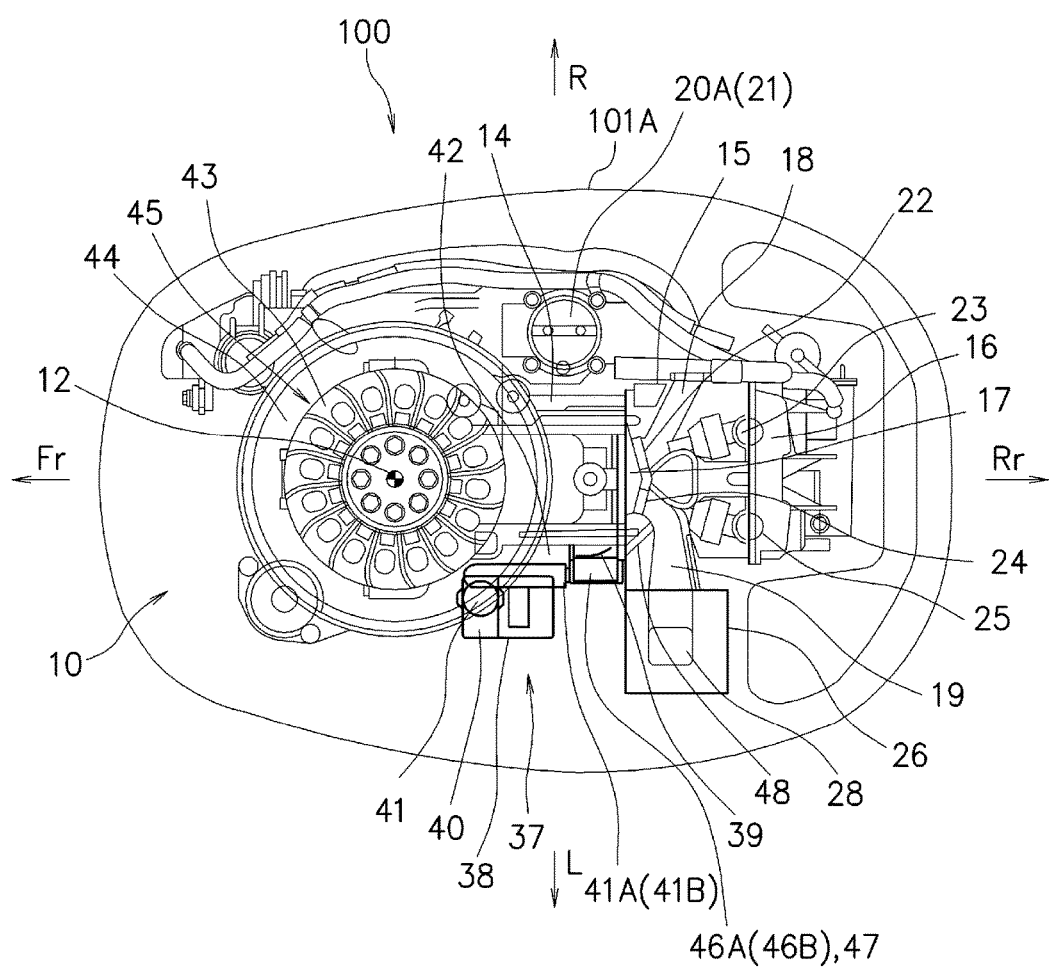
FIG. 10 is a top view illustrating an engine of an outboard motor according to a third embodiment of the invention.

According to the third embodiment, in particular, the intake silencer 38 is provided independently from surrounding members of the secondary air supply system 37. That is, unlike the first embodiment in which the silencer 38 is formed integrally with a part of the flywheel cover 44, the silencer 38 is independently provided. Although the silencer 38 and the flywheel cover 44 are overlapped with each other in FIG. 10, the silencer 38 may be arranged under the flywheel cover 44 with an appropriate gap.

In the engine for the outboard motor according to the third embodiment of the invention, since the intake silencer 38 is provided independently from surrounding members, it is possible to arrange the secondary air supply system 37 with high arrangement freedom. Although highly effective purification performance for the exhaust gas can be obtained using the secondary air supply system 37, it is very difficult to install the secondary air supply system 37 in the engine housing 118 which occupies a particularly small space. According to the third embodiment, it is possible to effectively arrange the secondary air supply system 37 by effectively utilizing the small space.

Fourth Embodiment

Next, an engine for an outboard motor according to a fourth embodiment of the invention will be described. According to the fourth embodiment, the engine 10 and the exhaust system have similar configurations as those of the first embodiment.

Figure 11:
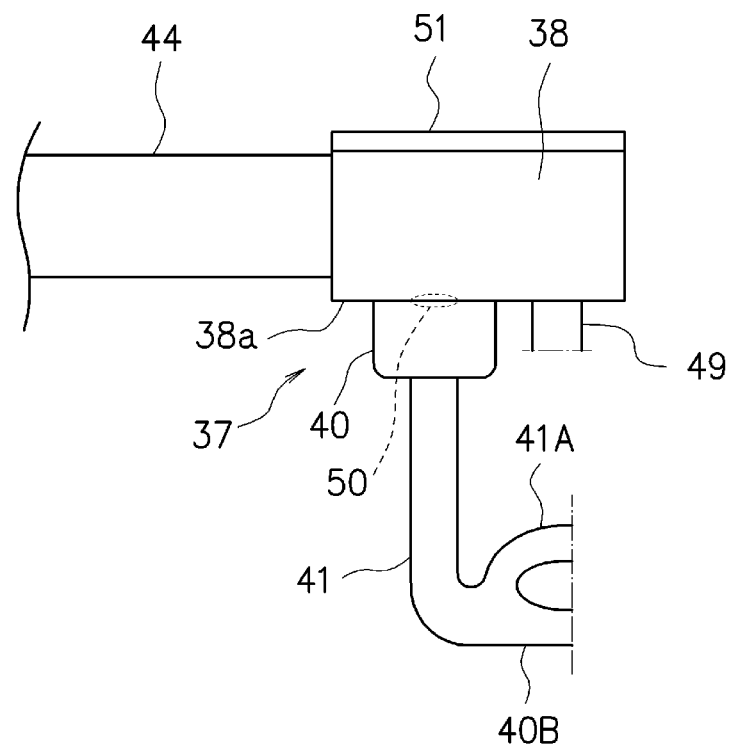
FIG. 11 is a diagram illustrating a configuration example of a secondary air supply system according to a fourth embodiment of the invention.

In particular, as illustrated in FIG. 11, the intake silencer 38 is fixed to an upper part of the engine body and is fixedly supported by the flywheel cover 44 that covers the flywheel magneto 43.

In this case, a part of the flywheel cover 44, for example, a side portion or the like can be used as a support member. Therefore, it is possible to eliminate necessity of a stay or the like dedicated to the intake silencer 38 and simplify the configuration.

According to the fourth embodiment of the invention, the secondary air supply control valve 40 is provided in an outlet port of the intake silencer 38 and is connected to the secondary air supply passage 41. The secondary air supply control valve 40 is directly connected to the outlet port 50 provided in the bottom surface 38*a* of the intake silencer 38, and the secondary air supply passage 41 connected to the secondary air supply control valve 40 branches into two separate ways.

According to the fourth embodiment of the invention, it is possible to eliminate necessity of a stay or the like for supporting the secondary air supply control valve 40 and simplify the configuration. In addition, if the flywheel cover 44 is formed of a synthetic resin material, it is possible to absorb vibration of the engine 10 using the flywheel cover 44. Therefore, it is possible to eliminate necessity of a special anti-vibration structure.

While preferred embodiments of the invention have been described and illustrated hereinbefore, it should be understood that they are only for exemplary purposes and are not to be construed as limitations. Any addition, omission, substitution, or modification may be possible without departing from the spirit or scope of the present invention.

Although the engine 10 is an in-line four-cylinder engine in the embodiments described above, the number of cylinders in the engine 10 may change.

According to the present invention, the secondary air supply system is arranged in a side portion of the cylinder block placed between the crankcase of the engine body and as assembly of the exhaust manifold and the cylinder head. Since the secondary air supply system is arranged in the side portion of the cylinder block which is narrow in the left-right direction, it is possible to compactly configure the outboard motor, particularly, in terms of the width of the left-right direction.

What is claimed is:

1. An engine for an outboard motor comprising:
    an in-line multiple-cylinder engine body provided with a crankshaft having an axial line directed to a vertical direction and a plurality of vertically overlapping cylinders, the cylinders having axial lines directed backward in a horizontal direction;
    an intake system configured to supply combustion air to the engine body;
    an exhaust passage formed to connect the engine body and middle and lower units thereunder; and
    an air pump of a secondary air supply system configured to supply secondary air to the exhaust passage,
    wherein a vertically extending exhaust manifold formed by connecting the exhaust passage to exhaust ports provided in each cylinder of the engine body is arranged in a side portion of the cylinder head,
    the secondary air supply system has
        an intake silencer box having an inlet port and an outlet port for the secondary air, the intake silencer box having a bottom surface formed integrally with a part of the flywheel cover and an upper part capped by a lid member and integrated with the flywheel cover,
        a check valve configured to permit only a flow of the secondary air to the exhaust passage side,
        a secondary air supply control valve configured to control a flow rate of the secondary air, and
        a secondary air supply passage configured to connect the intake silencer, the check valve, and the secondary air supply control valve to each other and the exhaust passage, and
    the secondary air supply system is arranged in a side portion of a cylinder block placed between a crankcase of the engine body and an assembly of the exhaust manifold and the cylinder head.

2. The engine for the outboard motor according to claim 1, wherein the intake silencer box is fixedly supported by an upper part of the engine body over the check valve corresponding to the cylinder placed thereunder.

3. The engine for the outboard motor according to claim 2, wherein the intake silencer box is fixedly supported by a flywheel cover fixed to an upper part of the engine body to cover a flywheel magneto installed to rotate in synchronization with an upper end of the crank shaft.

4. The engine for the outboard motor according to claim 3, wherein the secondary air supply control valve is provided in an outlet port of the intake silencer box, is connected to the secondary air supply passage, and is fixedly supported by an upper part of the engine body by interposing the intake silencer box and the flywheel cover.

\* \* \* \* \*